(12) United States Patent
Czompo (10) Patent No.: US 8,779,915 B2
(45) Date of Patent: Jul. 15, 2014

(54) IMPROVING MOTION SENSING BY IDENTIFYING A KEYSTROKE

(75) Inventor: Joseph Czompo, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 504 days.

(21) Appl. No.: 13/209,971

(22) Filed: Aug. 15, 2011

(65) Prior Publication Data
US 2013/0044010 A1 Feb. 21, 2013

(51) Int. Cl.
*G06F 11/00* (2006.01)

(52) U.S. Cl.
USPC ............................ 340/500; 340/501; 340/3.43

(58) Field of Classification Search
CPC ......... G06F 3/00; G06F 3/033; G06F 3/0338; G06F 3/0346; G06F 11/00; G06F 11/008; G06F 11/07
USPC ........ 340/500, 501, 686.1, 689, 691.1, 691.7, 340/3.43; 455/414.2, 456.1, 556.2; 345/156, 158, 184; 715/863
See application file for complete search history.

(56) References Cited

U.S. PATENT DOCUMENTS

| | | | |
|---|---|---|---|
| 6,369,794 B1 | 4/2002 | Sakurai et al. | |
| 7,176,888 B2 * | 2/2007 | Marvit et al. | 345/156 |
| 7,567,664 B2 | 7/2009 | Hoffman | |
| 8,351,910 B2 * | 1/2013 | Horodezky et al. | 455/414.2 |
| 2005/0216867 A1 | 9/2005 | Marvit et al. | |
| 2007/0119698 A1 * | 5/2007 | Day | 200/510 |
| 2009/0102818 A1 * | 4/2009 | Xu et al. | 345/184 |
| 2010/0088061 A1 | 4/2010 | Horodezky et al. | |
| 2010/0136957 A1 | 6/2010 | Horodezky et al. | |
| 2010/0141577 A1 | 6/2010 | Moritaku | |
| 2010/0194682 A1 | 8/2010 | Orr et al. | |
| 2012/0260220 A1 * | 10/2012 | Griffin | 715/863 |

FOREIGN PATENT DOCUMENTS

EP 2219102 A1 8/2010

OTHER PUBLICATIONS

Crossan. A., (Apr. 2005) . "Gait phase effects in mobile interaction." Conference on Human Factors in Computing Systems: CHI '05 extended abstracts on Human factors in computing systems, doi:10. 1145/10s6808 . 10s 6904.
International Search Report and Written Opinion—PCT/US2012/049736—ISA/EPO—Feb. 21, 2013.

* cited by examiner

*Primary Examiner* — Vqn T. Trieu
(74) *Attorney, Agent, or Firm* — Muncy, Geissler, Olds & Lowe, P.C.

(57) ABSTRACT

Provided are methods and apparatus for improving motion sensing. In an example, provided is a method of mitigating an error in a motion sensor signal in a mobile device. A user input signal, based on a user input to the mobile device, is received. The user input can be a keystroke, and the user input signal can be a signal resulting from the keystroke. The user input signal triggers performing a function on a motion sensor signal for a period of time. The motion sensor signal can be an output from an accelerometer and/or a gyroscope. The period of time can be based on the duration of the user input signal, and can be in a range between substantially 100 milliseconds to substantially 700 milliseconds.

44 Claims, 6 Drawing Sheets

IMPROVING MOTION SENSING BY IDENTIFYING A KEYSTROKE

FIELD OF DISCLOSURE

This disclosure relates generally to electronics, and more specifically, but not exclusively, to apparatus and methods for improving motion sensing.

BACKGROUND

A conventional mobile device, such as a mobile telephone having a motion sensing system, typically allows an operator to input a command via a button. The button can be a stand-alone button, part of a keypad, part of a keyboard, or part of a touch screen. Actuating the button momentarily moves the mobile device by a slight amount. Accelerometers and gyroscopes in the mobile device's motion sensing system sense the momentary movement, which is not necessarily the motion intended to be detected by the mobile device's motion sensors. This momentary movement can alone seem insignificant, however, errors in sensed motion (e.g., acceleration and/or rotation rates) that each button actuation induces into the motion sensor output quickly accumulate. As a result, the cumulative effect of button actuation weakens the inertial sensing system's detection efficiency and lowers the system's accuracy.

Accordingly, there are long-felt industry needs for apparatus and methods that mitigate the shortcomings of conventional methods and apparatus, including improving motion sensing, mitigating an error in a motion sensor output, and accurately self-determining the mobile device's environment in the presence of a keystroke on the mobile device.

SUMMARY

This summary provides a basic understanding of some aspects of the present teachings. This summary is not exhaustive in detail, and is neither intended to identify all critical features, nor intended to limit the scope of the claims.

In an example, methods and apparatus for mitigating an error in a motion sensor signal in a mobile device are provided. The motion sensor signal can be an accelerometer output signal and/or a gyroscope output signal. A user input signal based on a user input to the mobile device is received. The user input signal can be a keystroke signal. A function is performed on a motion sensor signal for a period of time. The function is triggered by the user input signal. The period of time can be based on the duration of the user input signal, and can be in a range between substantially 100 milliseconds to substantially 700 milliseconds. The motion sensor signal can be delayed for a time substantially equivalent to a time required to actuate a key. The performing the function can cease after a key is released, a delay substantially equivalent to a time required to actuate a key has passed, and/or a delay substantially equivalent to a time required to release the key has passed. The function can hold a recent undisturbed value of the motion sensor signal constant and/or can substitute an undisturbed value of the motion sensor signal.

In a further example, provided is a non-transitory computer-readable medium, comprising instructions stored thereon that, if executed by a processor, cause the processor to execute at least a part of the aforementioned method.

In another example, provided is an apparatus configured to mitigate an error in a motion sensor output in a mobile device. The apparatus includes means for receiving a user input signal based on a user input to the mobile device and means for performing a function on a motion sensor signal for a period of time. The function is triggered by the user input signal. An accelerometer can be coupled to the means for performing the function, so the motion sensor signal is an accelerometer output signal. A gyroscope can be coupled to the means for performing the function, so the motion sensor signal is a gyroscope output signal. The user input signal can be a keystroke signal. The period of time can be based on the duration of the user input signal. The period of time can be in a range between substantially 100 milliseconds to substantially 700 milliseconds. The apparatus can be integrated into a mobile device and/or at least a part of the apparatus can be integrated on a semiconductor die. The apparatus can also include means for delaying the motion sensor signal for a time substantially equivalent to a time required to actuate a key. The apparatus can also include means for ceasing the performing the function after a key is released, a delay substantially equivalent to a time required to actuate a key has passed, and a delay substantially equivalent to a time required to release the key has passed. The function can hold a recent undisturbed value of the motion sensor signal constant and/or can substitute an undisturbed value of the motion sensor signal.

The apparatus can be integrated into a device, selected from the group consisting of a settop box, music player, video player, entertainment unit, navigation device, communications device, personal digital assistant (PDA), fixed location data unit, and a computer. In a further example, provided is a non-transitory computer-readable medium, comprising instructions stored thereon that, if executed by a lithographic device, cause the lithographic device to fabricate at least a part of the apparatus.

In another example, provided is an apparatus configured to mitigate an error in a motion sensor output in a mobile device. The apparatus includes a processor configured to receive a user input signal based on a user input to the mobile device, receive a motion sensor signal, and perform a function on the motion sensor signal for a period of time. The function is triggered by the user input signal. An accelerometer can be coupled to the processor, so the motion sensor signal is an accelerometer output signal. A gyroscope can be coupled to the processor, so the motion sensor signal is a gyroscope output signal. The user input signal can be a keystroke signal. The period of time can be based on the duration of the user input signal. The period of time can be in a range between substantially 100 milliseconds to substantially 700 milliseconds. The apparatus can be integrated into a mobile device and/or at least a part of the apparatus can be integrated on a semiconductor die. The processor can be further configured to delay the motion sensor signal for a time substantially equivalent to a time required to actuate a key. The processor can be further configured to cease the performing the function after a key is released, a delay substantially equivalent to a time required to actuate a key has passed, and/or a delay substantially equivalent to a time required to release the key has passed. The function can hold a recent undisturbed value of the motion sensor signal constant and/or can substitute an undisturbed value of the motion sensor signal.

The apparatus can be integrated into a device, selected from the group consisting of a set top box, music player, video player, entertainment unit, navigation device, communications device, personal digital assistant (PDA), fixed location data unit, and a computer. In a further example, provided is a non-transitory computer-readable medium, comprising instructions stored thereon that, if executed by a lithographic device, cause the lithographic device to fabricate at least a part of the apparatus.

The foregoing has broadly outlined some of the features and technical advantages of the present teachings in order that the detailed description that follows may be better understood. Additional features and advantages are also described. The conception and disclosed embodiments can be readily utilized as a basis for modifying or designing other structures for carrying out the same purposes of the present teachings. Such equivalent constructions do not depart from the technology of the teachings as set forth in the appended claims. The novel features which are characteristic of the teachings, together with further objects and advantages, are better understood from the detailed description and the accompanying figures. Each of the figures is provided for the purpose of illustration and description only, and does not define limits of the present teachings.

BRIEF DESCRIPTION OF THE DRAWINGS

The accompanying drawings are presented to describe examples of the present teachings, and are not provided as limitations.

In accordance with common practice, the various features illustrated in the drawings may not be drawn to scale. Accordingly, the dimensions of the various features may be arbitrarily expanded or reduced for clarity. Additionally, some of the drawings are simplified for clarity. Thus, the drawings may not depict all components of a given apparatus (e.g., device) or method. Finally, like reference numerals are used to denote like features throughout the specification and figures.

DETAILED DESCRIPTION

Examples of the current teachings are disclosed in this application's text and related drawings. The examples advantageously address the long-felt industry needs, as well as other previously unidentified needs, and mitigate shortcomings of the conventional methods and apparatus. Alternate embodiments may be devised without departing from the scope of the invention. Additionally, conventional elements of the current teachings may not be described in detail, or may be omitted, to avoid obscuring aspects of the current teachings.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. Use of the terms "in one example", "an example", "in one feature" and/or "a feature" in this specification do not necessarily refer to the same feature and/or example. Furthermore, a particular feature and/or structure can be combined with one or more other features and/or structures.

It should be noted that the terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As employed herein two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

It should be understood that the term "signal" can include any signal such as a data signal, audio signal, video signal, multimedia signal. Information and signals can be represented using any of a variety of different technologies and techniques. For example, data, instructions, commands, information, signals, bits, symbols, and chips that can be referenced throughout this description can be represented by voltages, currents, electromagnetic waves, magnetic fields or particles, optical fields or particles, or any combination thereof.

It should be understood that any reference to an element herein using a designation such as "first," "second," and so forth does not generally limit the quantity or order of those elements. Rather, these designations can be used herein as a convenient method of distinguishing between two or more elements or instances of an element. Thus, a reference to first and second elements does not mean that only two elements can be employed, or that the first element must precede the second element. Also, unless stated otherwise a set of elements can comprise one or more elements. In addition, terminology of the form "at least one of: A, B, or C" used in the description or the claims means "A or B or C or any combination of these elements."

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In the following description, certain terminology is used to describe certain features. The term "mobile device" includes, and is not limited to, a mobile phone, a mobile communication device, personal digital assistant, mobile palm-held computer, a wireless device, a portable navigation device, and/or other types of mobile devices typically carried by individuals and/or having an inertial sensor. As used herein, a "handheld mobile device," "mobile device," or a "mobile station" refers to a device that can from time to time have a position and/or orientation that can be altered. Such changes in position and/or orientation can comprise changes to direction, distance, angular rotation, etc., as a few examples. A mobile device can also comprise a processor and/or computing platform adapted to perform functions controlled by machine-readable instructions.

Provided are methods and apparatus for improving motion sensing. In an example, provided is a method of mitigating an error in a motion sensor output in a mobile device. A user input signal, based on a user input to the mobile device, is received. The user input can be a keystroke, and the user input signal can be a signal resulting from the keystroke. The user input signal triggers performing a function (e.g., gating, holding constant, value substitution, etc.) on a motion sensor input for a period of time. The motion sensor input can be an output from an accelerometer and/or a gyroscope. The period of time can be based on the duration of the user input, and can be in a range between substantially 100 milliseconds to substantially 700 milliseconds.

A mobile device can include a single motion sensor or multiple motion sensors, which convert physical phenomena, such as an engine vibration, into an electrical signal (i.e., a motion sensor output signal). Examples of motion sensors include, for example: (1) an accelerometer used to sense the direction of gravity and other linear forces; and (2) a gyroscope used to measure a Coriolis effect, heading changes, and rotation.

A motion sensor output can enable a feature of a mobile application, such as an inertial navigation system, depending on which sensors are integrated into the mobile device. Some applications can employ more than one measurement from at least one motion sensor, and can employ multiple degrees (axes) of observability from a motion sensor. Further, different applications can employ different combinations of motion sensors, where the motion sensors perform different roles.

Figure 1A:
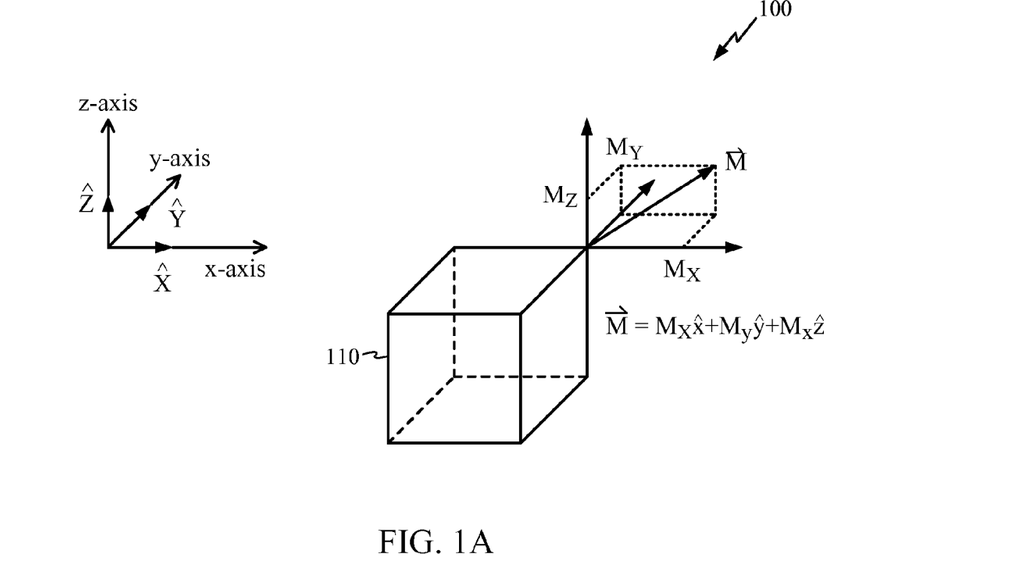
FIG. 1A depicts an exemplary coordinate system for representing linear movement as measured by a motion sensor.

FIG. 1A depicts an exemplary coordinate system 100 for representing linear movement as measured by a motion sensor, such as an accelerometer 110. In general, the accelerometer 110 detects motion and generates information (e.g., a motion sensor output signal) indicative of movement along one, two, or three axes. FIG. 1A shows the Cartesian coordinate space (x, y, z) for representing the linear movement with respect to scalar values, a series of scalar values, and time varying functions ($M_X$, $M_Y$, $M_Z$), as measured by the accelerometer 110. Some accelerometers can provide a magnitude, while other accelerometers provide an indication of movement without a magnitude. An accelerometer can measure linear movement (vector M) along a line with reference to one, two or three linear directions, often referenced with the Cartesian coordinates (x, y, z). For example, a one-dimensional accelerometer can provide measurements to indicate linear movement along a single axis (e.g., the x-axis). A two-dimensional accelerometer can provide measurements to indicate linear movement in a plane along two axes (e.g., both the x-axis and the y-axis). Further, a three-dimensional accelerometer can provide measurements to indicate linear movement in three-dimensional space (e.g., along the x, y, and z-axes). A three-dimensional accelerometer can comprise a two-dimensional accelerometer combined with a one-dimensional accelerometer, or can comprise three one-dimensional accelerometers. An accelerometer can provide measurements in terms of linear acceleration (in units representing distance per units of time squared; e.g., [m/sec$^2$]). Linear motion (vector M) can be represented by three values in vector form $M=M_X X+M_Y Y+M_Z Z$, where ($M_X$, $M_Y$, $M_Z$) are magnitudes, scalar values, a series of scalar values, and/or time varying functions, and (X, Y, Z) are unit vectors with respect to the origin of the Cartesian coordinate system (x, y, z). Alternatively, a non-Cartesian coordinate system can be used, such as a coordinate system aligned with a frame of the mobile device.

Figure 1B:
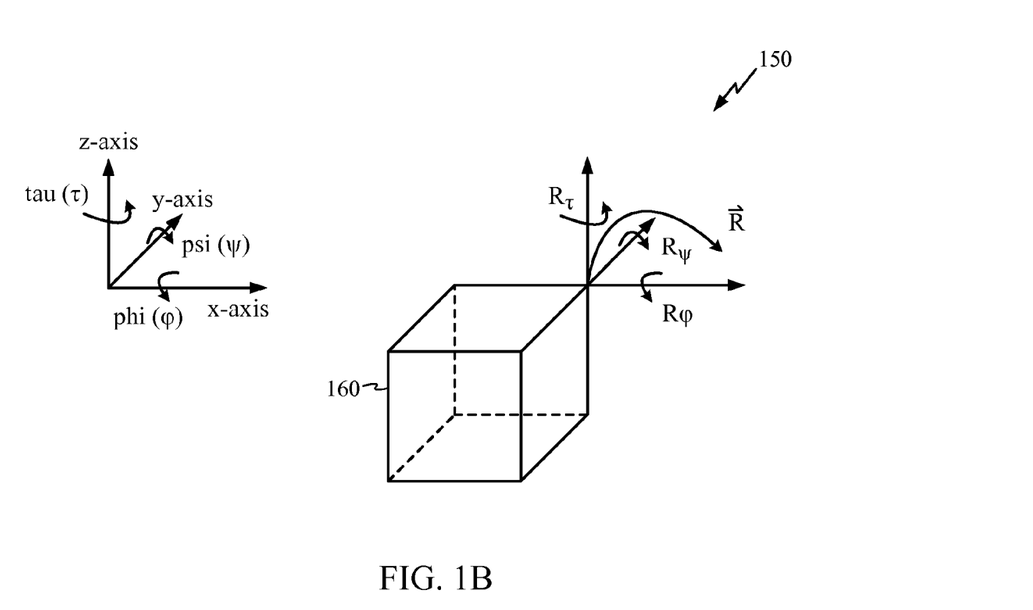
FIG. 1B depicts an exemplary coordinate system for representing rotational movement as measured by a gyroscope.

FIG. 1B depicts an exemplary coordinate system 150 for representing rotational movement as measured by a motion sensor, such as a gyroscope 160. The gyroscope 160 can detect motion and produce information indicative of angular movement about one, two, or three axes. FIG. 1B shows a coordinate system ($\tau$, $\phi$, $\psi$) for representing rotational movement with respect to scalar values, a series of scalar values, and/or time varying functions ($R_\tau$, $R_\phi$, $R_\psi$) as measured by the gyroscope 160. Thus, the gyroscope 160 can measure rotational movement (vector R) about one, two or three axes. In one particular implementation, gyroscopic rotation can be measured in terms of coordinates ($\tau$, $\phi$, $\psi$), where tau ($\tau$) represents yaw or rotation about the z-axis, phi ($\phi$) represents roll or rotation about the x-axis, and psi ($\psi$) represents pitch or rotation about the y-axis. In another implementation, the gyroscope 160 can comprise a one-dimensional gyroscope to provide measurements indicating rotational movement about a first axis. In another implementation, the gyroscope 160 can comprise a two-dimensional gyroscope to provide measurements indicating rotational movement about a first axis and a second axis. In yet another implementation, the gyroscope 160 can comprise a three-dimensional gyroscope to provide measurements indicating rotational movement about first, second, and third axes. The three-dimensional gyroscope can comprise a two-dimensional gyroscope combined with a one-dimensional gyroscope, or can comprise three one-dimensional gyroscopes. The gyroscope 160 can provide measurements in terms of angular velocity (in units representing change in an angle per unit of time; e.g., [rad/sec]). Rotational motion (vector R) can be represented by three scalar values, a series of scalar values, an/or time varying functions in vector from, where $R=R_\tau \tau+R_\phi \phi+R_\psi \psi$, where ($R_\tau$, $R_\phi$, $R_\psi$) are scalar values, a series of scalar values, and/or time varying functions, and where ($\tau$, $\phi$, $\psi$) are unit vectors with respect to the rotational coordinate system ($\tau$, $\phi$, $\psi$).

In the case of navigation, accelerometers and gyroscopes ("gyros") can be used to provide a motion sensor output signal based on at least one of the six axes of observability (x, y, z, $\tau$, $\phi$, $\psi$). An accelerometer can sense linear motion (i.e., translation in a plane, such as a horizontal plane). Translation can be measured with reference to at least two axes. The accelerometer can also measure the mobile device's tilt (i.e., roll and/or pitch). Thus, with a single three-dimensional accelerometer, the mobile device's motion in Cartesian coordinate space (x, y, z) can be sensed, and the direction of gravity can be sensed to estimate the mobile device's roll ($\tau$) and pitch ($\phi$). Since accelerometers cannot easily differentiate between the mobile device's linear motion and tilt, a gyroscope can be used to measure the rotation about (x, y, z) coordinates, that is, roll ($\tau$), pitch ($\phi$), and yaw ($\psi$), which is sometime referred to as azimuth or heading. In movement detection applications, linear and angular accelerometers and/or gyroscopes can be integrated into the mobile device to provide adequate degrees of observability. The accelerometer 110 can sense linear movement while the gyroscope 160 can measure angular movement such as a tilt or roll. Integrating two separate accelerometers 110 or a combination of the accelerometer 110 and the gyroscope 160 into a mobile device can be used to sense linear movement as well as angular movement.

Figure 2:
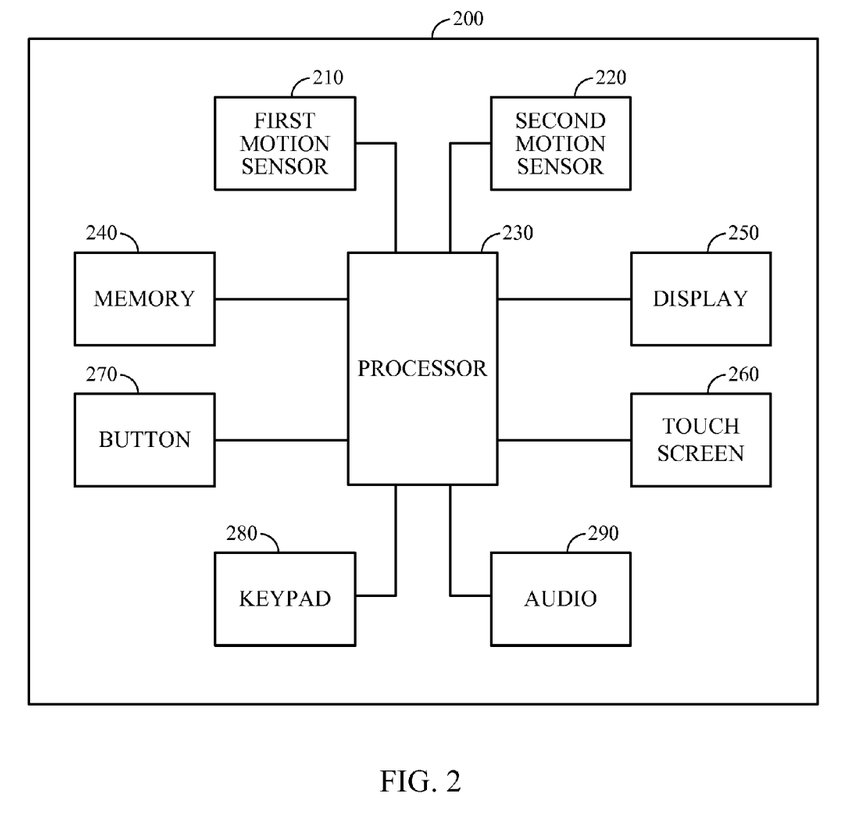
FIG. 2 is an exemplary schematic diagram of a mobile device.

FIG. 2 is an exemplary schematic diagram of a mobile device 200. The mobile device 200 can include a first motion sensor 210, a second motion sensor 220, a processor 230, a memory 240, and a display 250. The first motion sensor 210 can include the accelerometer 110, and the second motion sensor 220 can include the gyroscope 160. The accelerometer 110 provides an accelerometer output signal to the processor 230, and the gyroscope 160 provides a gyroscope output signal to the processor 230. Although only two motion sensors are shown in FIG. 2, it should be appreciated that additional, or fewer, motion sensors can be used. Further, a single motion sensor (e.g., the first motion sensor 210) can be configured to measure both linear and angular motion. The mobile device 200 also includes devices and circuitry to accept user input, such as a touch screen 260, a button 270, a keypad 280, and/or an audio device 290 (e.g., a microphone). The mobile device 200 also includes devices and circuitry to provide output data, such as the display 250, and/or the audio device 290 (e.g., a speaker).

In an example, the processor 230 is configured to identify and/or mitigate an error in a motion sensor output (e.g., a signal output from the first motion sensor 210) resulting from actuating the button 270, and/or the touch screen 260. An indication of a keypress event is available to the processor 230 as a hardware or software signal, which is used by the processor 230 to identify a portion of the accelerometer output signal and/or the gyroscope output signal that is disturbed by the keypress event. A motion processing algorithm then can mitigate the disturbed portion of the accelerometer output signal and/or the gyroscope output signal. This advantageously mitigates the effects of the keypress-induced error, and increases the motion sensing system's detection efficiency and accuracy.

In a further example, the processor 230 is configured to receive a user input signal based on a user input to the mobile device, such as a keypress event resulting from actuating the button 270 and/or the touch screen 260. The processor 230 also receives a motion sensor signal that is output from the first motion sensor 210 and/or the second motion sensor 220. The user input signal triggers gating of the motion sensor signal for a period of time. Gating can include inhibiting, suppressing, and/or restricting the motion sensor input in some manner. In an example, a motion processing and/or identification algorithm executed by the processor 230 can perform the gating. In another example, the user input signal controls a switch to gate the motion sensor input. The duration of the gating can be based on the duration of the user input, and can range, for example, between substantially 100 milliseconds to substantially 700 milliseconds.

In an example, at least a portion of the processor 230 is integrated into a device, comprising a music player, video player, entertainment unit, navigation device, communications device, personal digital assistant (PDA), and/or a computer, into which the processor 230 is integrated. At least a portion of the mobile device 200 can be integrated on a semiconductor die.

Figure 3A:
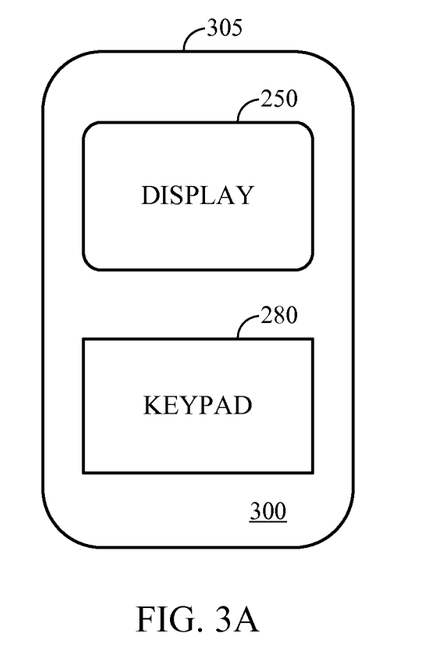
FIGS. 3A-B also show exemplary mobile devices.
Figure 3B:
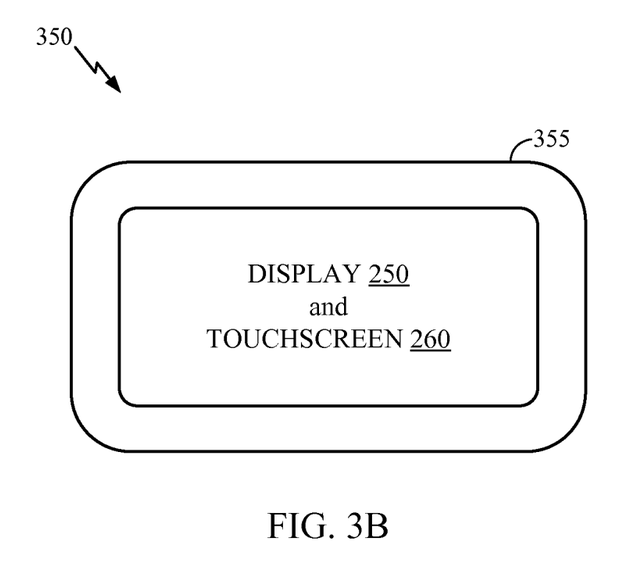

FIGS. 3A-B show exemplary mobile devices 300, 350 into which the processor 230 can be integrated. In FIG. 3A, an exterior view of mobile device 300 is shown, including a housing 305, the display 250, and the keypad 280. In FIG. 3B, an exterior view of mobile device 350 is shown, including a housing 355. In the mobile device 350, the display 250 and the touch screen 260 are substantially combined.

Figure 4A:
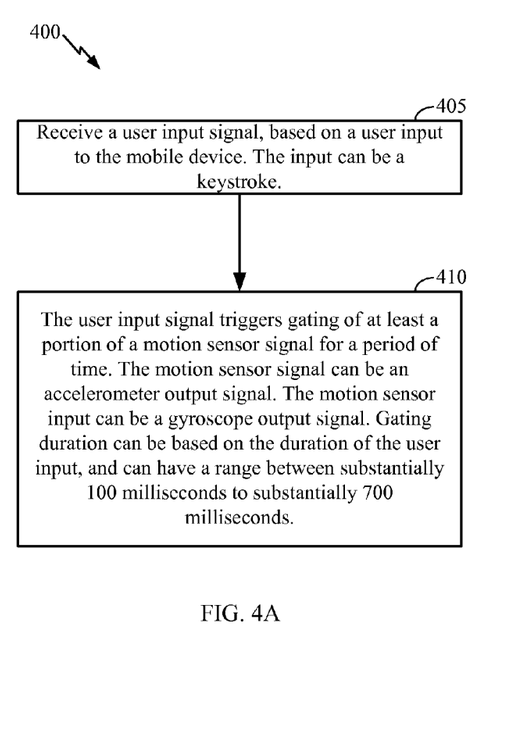
FIGS. 4A-B depict an exemplary apparatus and method of mitigating an error in a motion sensor output in a mobile device.

FIG. 4A depicts an exemplary method of mitigating effects of an error in a motion sensor output in a mobile device 400, which can be performed by the apparatus described hereby, such as the processor 230.

In step 405, a user input signal, based on a user input to the mobile device, is received. The user input can be a keystroke.

In step 410, the user input signal triggers gating of at least a portion of a motion sensor signal for a period of time. The motion sensor signal can be an accelerometer output signal. The motion sensor signal can be a gyroscope output signal. Gating duration can be based on the duration of the user input, and can have a range between substantially 100 milliseconds to substantially 700 milliseconds.

Figure 4B:
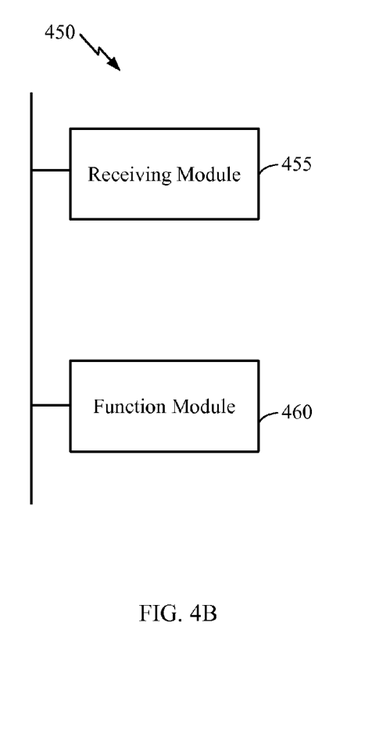

FIG. 4B depicts an exemplary apparatus for mitigating effects of an error in a motion sensor output in a mobile device 450. The apparatus 450 includes a receiving module 455 configured to receive a user input signal, based on a user input to the mobile device. In one example the user input can be a keystroke. The apparatus 450 also includes a function module 460 configured to perform a function on the motion sensor signal to mitigate the error. The function can include triggering, based on the user input signal, gating of the motion sensor signal for a period of time. The motion sensor signal can be an accelerometer output signal. The motion sensor signal can be a gyroscope output signal. Gating duration can be based on the duration of the user input, and can have a range between substantially 100 milliseconds to substantially 700 milliseconds.

It will be recognized that the modules (e.g., 455, 460) described herein can be implemented as specific circuits, program instructions being executed by one or more processors (e.g., processor 230), or by a combination of both. Accordingly, the various aspects of the invention can be embodied in a number of different forms, all of which have been contemplated to be within the scope of the claimed subject matter.

Figure 5:
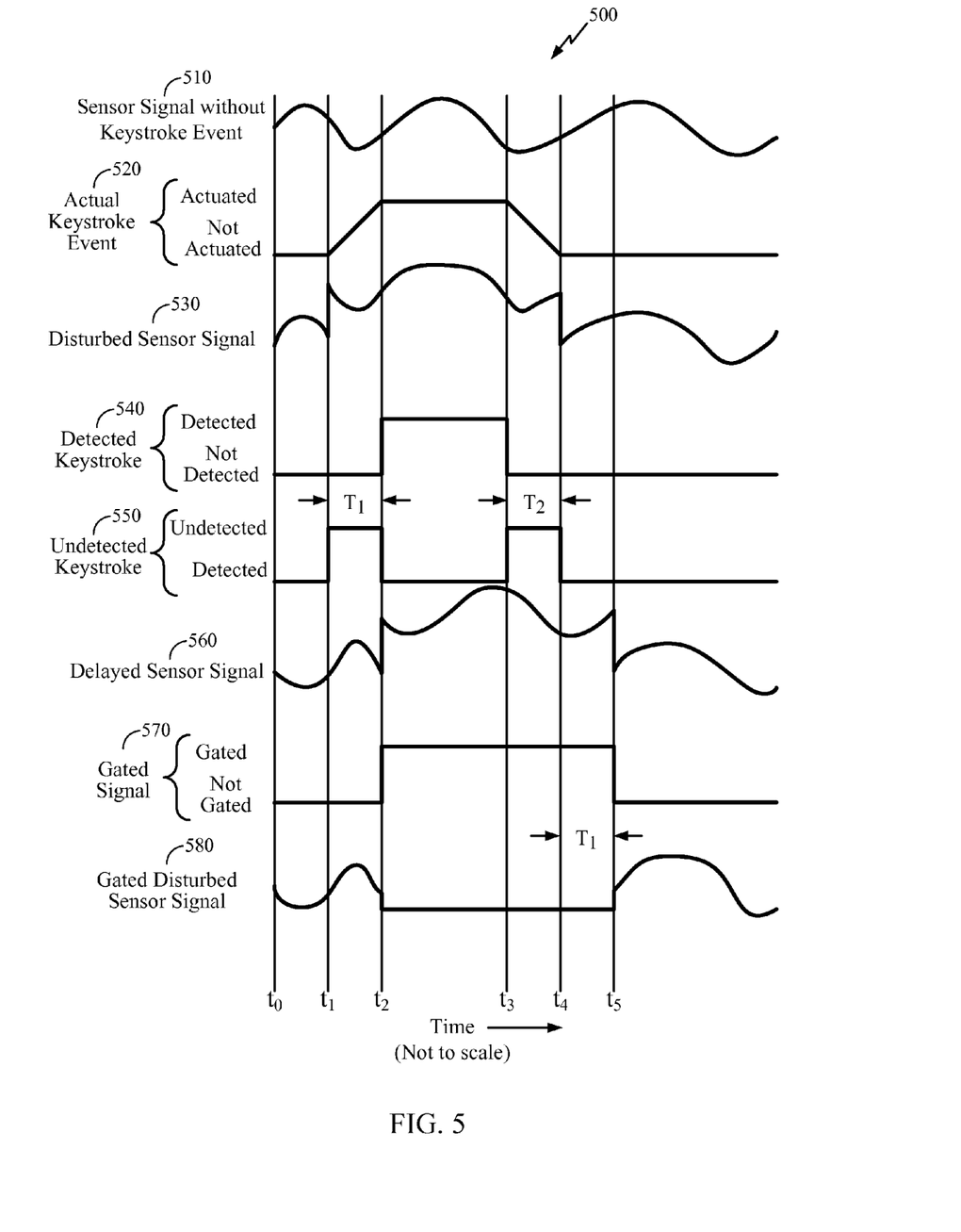
FIG. 5 depicts an exemplary timing diagram of a method to mitigate the delayed detection effect.
Figure 6:
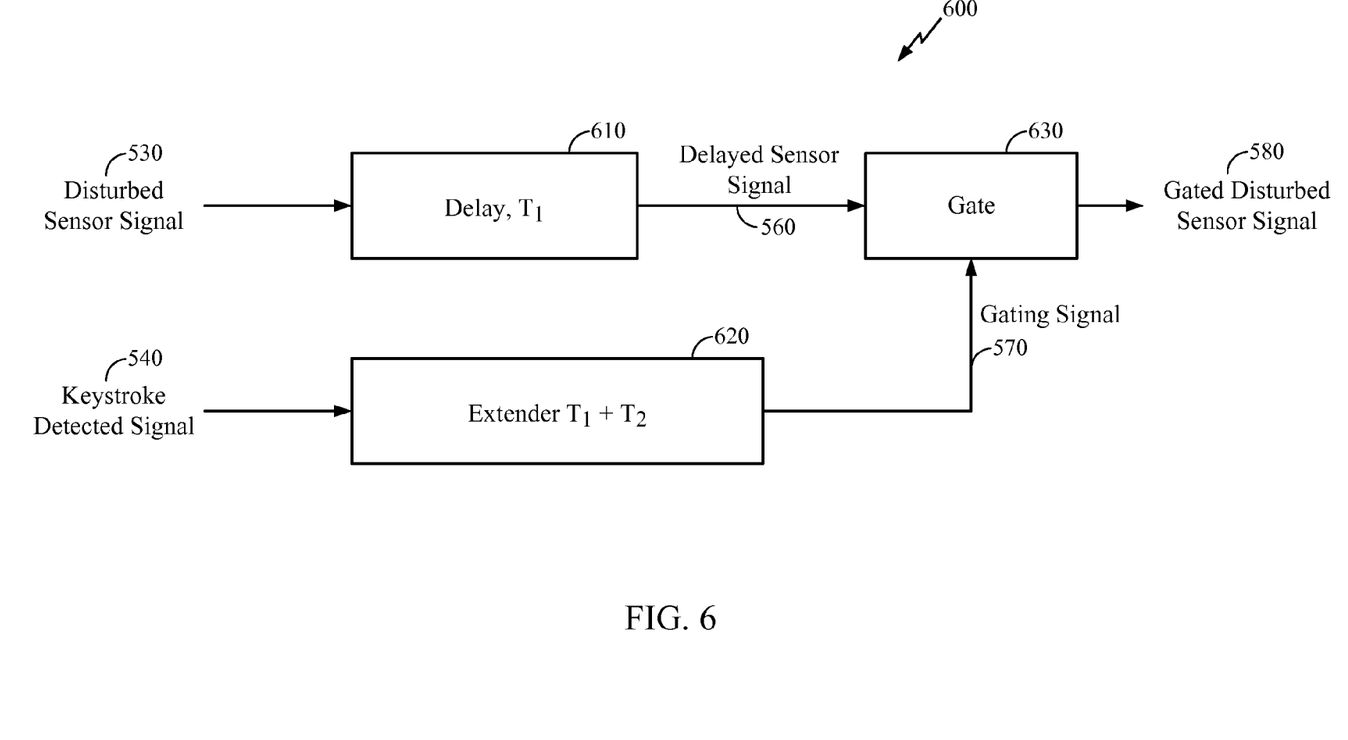
FIG. 6 depicts an exemplary sensor signal gating and delay circuit.

FIGS. 5-6 depict a method and apparatus to mitigate an effect of delay in detecting a keystroke. In practical applications, there is a time delay between the start of actuation of a key, and an instant at which the keystroke is detected. During this delay, the sensor signal is not gated, but is disturbed by the keystroke. FIG. 5 further illustrates this delayed detection effect.

FIG. 5 depicts an exemplary timing diagram 500 of a method for mitigating the delayed detection effect. FIG. 5 is not to scale, thus the timing and amplitude relations between the illustrated signals are approximate. FIG. 5 depicts a sensor signal 510 in the absence of a keystroke event. An actual keystroke event 520 is also shown, with a key being depressed from time $t_1$ to time $t_4$. Unmitigated, the actual keystroke event 520 affects the sensor signal 510, and produces the disturbed sensor signal 530, which is disturbed by the keystroke from time $t_1$ to time $t_4$.

Detection of the keystroke 540 is shown from time $t_2$ to $t_3$. In an example, the keystroke detection starts at time $t_2$ when an electrical connection is made by the depressed key. It is important to note that there is a first delay (T1) (e.g., 100 ms) between the beginning of the key press ($t_1$) and the instant of keypress detection ($t_2$). The first delay (T1) is caused by a portion of the keystroke that is undetected, and is depicted as an undetected keystroke 550. The keystroke detection ends when the electrical connection is broken at time $t_3$ due to the key being released. There is a second delay (T2) (e.g., 100 ms) between the instant when the electrical connection is broken ($t_3$), and the depressed key returns to rest in an unactuated position ($t_4$). The second delay (T2) is also caused by a portion of the keystroke that is undetected, and is depicted as the undetected keystroke 550. If the delayed detection effect is unmitigated during the first and second delays (T1, T2), the disturbed sensor signal 530 can affect a navigation calculation, even if the disturbed sensor signal 530 is gated during the same time that the keystroke is detected (i.e., $t_2$ to $t_3$). A solution to this concern is to delay the disturbed sensor signal 530 by the first delay T1, and then apply the gating signal 570 to the delayed disturbed sensor signal 530 to mitigate the delayed detection effect. Application of the gating portion of the gating signal 570 to the delayed sensor signal 560 is shown at time $t_2$. As an alternative to applying the gating signal 570, the user input signal triggers performing a function on the delayed sensor signal 560 for a period of time. For example, the function can hold a recent undisturbed value of the delayed sensor signal 560 constant for a period of time. In a further example, the function can substitute an undisturbed value for the delayed sensor signal 560 for a period of time.

Ending the gating portion of the gating signal 570 starts with the break of the electrical connection due to release of the keystroke at time $t_3$. The gating signal 570 continues to gate the disturbed sensor signal 530 for a combined time of the first delay T1 and the second delay T2 to mitigate the delayed detection effect. Subsequently, the gating portion of the gating signal 570 ends at a time $t_5$. Gating the disturbed sensor signal 530 based on the gating signal 570 produces a gated disturbed sensor signal 580. The delayed detection effect can be mitigated with a circuit shown in FIG. 6.

FIG. 6 depicts an exemplary sensor signal gating and delay circuit 600. The disturbed sensor signal 530 is input to a delay circuit 610, which delays the disturbed sensor signal 530 by the first delay T1 to produce the delayed sensor signal 560. The keystroke detected signal 540 is input to an extender circuit 620, which outputs the rise of the keystroke detected signal 540 immediately to provide the gated portion of the gating signal 570. When the keystroke detected signal 540 indicates release of the key, the extender circuit 620 keeps the gated portion of the gating signal 570 gated for the sum of the first and second delays (T1+T2), and then ends the gating portion of the gating signal 570. The delayed sensor signal 560 and the gating signal 570 are input to a gate 630, which gates the delayed sensor signal 560, based upon the gating signal 570, to mitigate the delayed detection effect and to produce the gated disturbed sensor signal 580.

Those of skill in the art will appreciate that information and signals can be represented using any of a variety of different technologies and techniques. For example, data, instructions, commands, information, signals, bits, symbols, and chips that may be referenced throughout the above description can be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein can be implemented as electronic hardware, non-transient computer readable media storing instructions to perform a function described herein, and/or combinations of both. To clearly illustrate interchangeability of hardware and computer readable media, various illustrative components, blocks, modules, circuits, and steps have been described above generally in terms of their functionality. Whether such functionality is implemented as hardware and/ or computer readable media depends upon the particular application and design constraints imposed on the overall system. Skilled artisans can implement the described functionality in varying ways for each particular application, but such implementation decisions should not be interpreted as causing a departure from the scope of the present invention.

In some aspects, the teachings herein can be employed in a multiple-access system capable of supporting communication with multiple users by sharing the available system resources (e.g., by specifying one or more of bandwidth, transmit power, coding, interleaving, and so on). For example, the teachings herein can be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein can be designed to implement one or more standards, such as IS-95, cdma2000, IS-856, W-CDMA, TDSCDMA, and other standards. A CDMA network can implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein can be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure can be described using 3GPP terminology, it is to be understood that the teachings herein can be applied to 3GPP (e.g., Re199, Re15, Re16, Re17) technology, as well as 3GPP2 (e.g., 1xRTT, 1xEV-DO RelO, RevA, RevB) technology and other technologies. The techniques can be used in emerging and future networks and interfaces, including Long Term Evolution (LTE).

The methods, sequences and/or algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention can be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

An embodiment of the invention can include a computer readable media embodying a method described herein. Accordingly, the invention is not limited to illustrated examples and any means for performing the functionality described herein are included in embodiments of the invention.

The disclosed devices and methods can be designed and can be configured into GDSII and GERBER computer files, stored on a computer readable media. These files are in turn provided to fabrication handlers who fabricate devices, based on these files, with a lithographic device. The resulting products are semiconductor wafers that are then cut into semiconductor die and packaged into a semiconductor chip. The chips are then employed in devices described herein.

Nothing that has been stated or illustrated is intended to cause a dedication of any component, step, feature, object, benefit, advantage, or equivalent to the public, regardless of whether it is recited in the claims.

While this disclosure shows exemplary embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order.

What is claimed is:

1. A method of mitigating an error in a motion sensor signal in a mobile device, comprising:
   receiving a user input signal based on a user input to the mobile device; and
   performing a function on a motion sensor signal for a period of time to mitigate the error,
   wherein the function is triggered by the user input signal and the period of time lasts for a duration of the user input signal.

2. The method of claim 1, wherein the motion sensor signal is an accelerometer output signal.

3. The method of claim 1, wherein the motion sensor signal is a gyroscope output signal.

4. The method of claim 1, wherein the user input signal is a keystroke signal.

5. The method of claim 1, wherein the period of time is in a range between substantially 100 milliseconds to substantially 700 milliseconds.

6. The method of claim 1, further comprising delaying the motion sensor signal for a time substantially equivalent to a time required to actuate a key.

7. The method of claim 1, wherein the performing the function ceases after a key is released, and a delay substantially equivalent to a time required to actuate a key has passed, and a delay substantially equivalent to a time required to release the key has passed.

8. The method of claim 1, wherein the function holds a recent undisturbed value of the motion sensor signal constant.

9. The method of claim 1, wherein the function substitutes an undisturbed value of the motion sensor signal.

10. The method of claim 1, wherein the user input signal triggers gating of the motion sensor signal for the period of time.

11. An apparatus configured to mitigate an error in a motion sensor output in a mobile device, comprising:
    means for receiving a user input signal based on a user input to the mobile device; and
    means for performing a function on a motion sensor signal for a period of time to mitigate the error,
    wherein the function is triggered by the user input signal and the period of time lasts for a duration of the user input signal.

12. The apparatus of claim 11, further comprising an accelerometer coupled to the means for performing the function, wherein the motion sensor signal is an accelerometer output signal.

13. The apparatus of claim 11, further comprising a gyroscope coupled to the means for performing the function, wherein the motion sensor signal is a gyroscope output signal.

14. The apparatus of claim 11, wherein the user input signal is a keystroke signal.

15. The apparatus of claim 11, wherein the period of time is in a range between substantially 100 milliseconds to substantially 700 milliseconds.

16. The apparatus of claim 11, further comprising a mobile device into which the apparatus is integrated.

17. The apparatus of claim 11, wherein at least a part of the apparatus is integrated on a semiconductor die.

18. The apparatus of claim 11, further comprising means for delaying the motion sensor signal for a time substantially equivalent to a time required to actuate a key.

19. The apparatus of claim 11, further comprising means for ceasing the performing the function after a key is released, a delay substantially equivalent to a time required to actuate a key has passed, and a delay substantially equivalent to a time required to release the key has passed.

20. The apparatus of claim 11, wherein the function holds a recent undisturbed value of the motion sensor signal constant.

21. The apparatus of claim 11, wherein the function substitutes an undisturbed value of the motion sensor signal.

22. The apparatus of claim 11, wherein the function includes triggering, based on the user input signal, gating of the motion sensor signal for the period of time.

23. An apparatus configured to mitigate an error in a motion sensor output in a mobile device, comprising a processor configured to:
    receive a user input signal based on a user input to the mobile device;
    receive a motion sensor signal; and
    perform a function on the motion sensor signal for a period of time to mitigate the error,
    wherein the function is triggered by the user input signal and the period of time lasts for a duration of the user input signal.

24. The apparatus of claim 23, further comprising an accelerometer coupled to the processor, wherein the motion sensor signal is an accelerometer output.

25. The apparatus of claim 23, further comprising a gyroscope coupled to the processor, wherein the motion sensor signal is a gyroscope output.

26. The apparatus of claim 23, wherein the user input signal is a keystroke signal.

27. The apparatus of claim 23, wherein the period of time is in a range between substantially 100 milliseconds to substantially 700 milliseconds.

28. The apparatus of claim 23, further comprising a mobile device into which the apparatus is integrated.

29. The apparatus of claim 23, wherein at least a part of the apparatus is integrated on a semiconductor die.

30. The apparatus of claim 23, wherein the processor is further configured to delay the motion sensor signal for a time substantially equivalent to a time required to actuate a key.

31. The apparatus of claim 23, wherein the processor is further configured to cease the performing the function after a key is released, a delay substantially equivalent to a time required to actuate a key has passed, and a delay substantially equivalent to a time required to release the key has passed.

32. The apparatus of claim 23, wherein the function holds a recent undisturbed value of the motion sensor signal constant.

33. The apparatus of claim 23, wherein the function substitutes an undisturbed value of the motion sensor signal.

34. The apparatus of claim 23, wherein the function includes triggering, based on the user input signal, gating of the motion sensor signal for the period of time.

35. A non-transitory computer-readable medium, comprising instructions stored thereon that, if executed by a processor, cause the processor to perform a method to mitigate an error in a motion sensor output in a mobile device, the method comprising:
   receiving a user input signal based on a user input to the mobile device; and
   performing a function on a motion sensor signal for a period of time to mitigate the error,
   wherein the function is triggered by the user input signal and the period of time lasts for a duration of the user input signal.

36. The non-transitory computer-readable medium of claim 35, wherein the motion sensor signal is an accelerometer output signal.

37. The non-transitory computer-readable medium of claim 35, wherein the motion sensor signal is a gyroscope output signal.

38. The non-transitory computer-readable medium of claim 35, wherein the user input signal is a keystroke signal.

39. The non-transitory computer-readable medium of claim 35, wherein the period of time is in a range between substantially 100 milliseconds to substantially 700 milliseconds.

40. The non-transitory computer-readable medium of claim 35, wherein the method further comprises delaying the motion sensor signal for a time substantially equivalent to a time required to actuate a key.

41. The non-transitory computer-readable medium of claim 35, wherein the method further comprises ceasing the performing the function after a key is released, a delay substantially equivalent to a time required to actuate a key has passed, and a delay substantially equivalent to a time required to release the key has passed.

42. The non-transitory computer-readable medium of claim 35, wherein the function holds a recent undisturbed value of the motion sensor signal constant.

43. The non-transitory computer-readable medium of claim 35, wherein the function substitutes an undisturbed value of the motion sensor signal.

44. The non-transitory computer-readable medium of claim 35, wherein the function includes triggering, based on the user input signal, gating of the motion sensor signal for the period of time.

* * * * *